(12) United States Patent
Gurvich et al.

(10) Patent No.: US 12,247,614 B2
(45) Date of Patent: Mar. 11, 2025

(54) HYBRID COMPOSITE DRIVE SHAFT AND A METHOD OF MAKING

(71) Applicant: Goodrich Corporation, Charlotte, NC (US)

(72) Inventors: Mark R. Gurvich, Middletown, CT (US); Georgios S. Zafiris, Glastonbury, CT (US); Brayton Reed, New York Mills, NY (US); Joyel M. Schaefer, Earlville, NY (US); Michael J. King, Sauquoit, NY (US)

(73) Assignee: Goodrich Corporation, Charlotte, NC (US)

( * ) Notice: Subject to any disclaimer, the term of this patent is extended or adjusted under 35 U.S.C. 154(b) by 3 days.

(21) Appl. No.: 18/201,683

(22) Filed: May 24, 2023

(65) Prior Publication Data

US 2023/0383783 A1    Nov. 30, 2023

Related U.S. Application Data

(62) Division of application No. 16/370,489, filed on Mar. 29, 2019, now abandoned.

(51) Int. Cl.
*F16C 3/02*    (2006.01)
*B29C 43/20*    (2006.01)
(Continued)

(52) U.S. Cl.
CPC ............ *F16C 3/026* (2013.01); *B29C 43/203* (2013.01); *B32B 1/08* (2013.01); *B32B 27/08* (2013.01);
(Continued)

(58) Field of Classification Search
CPC ... F16C 3/026; B29C 43/203; B29K 2101/10; B29K 2101/12; B32B 1/08;
(Continued)

(56) References Cited

U.S. PATENT DOCUMENTS 4,171,626 A    10/1979  Yates et al.
4,173,128 A    11/1979  Corvelli
(Continued)

FOREIGN PATENT DOCUMENTS

CA    1098329 A    3/1981
GB    2017260 A    10/1979

OTHER PUBLICATIONS

Extended European Search Report dated Apr. 30, 2020, issued during the prosecution of European Patent Application No. EP 19209764.0.

*Primary Examiner* — Yan Lan
(74) *Attorney, Agent, or Firm* — Kinney & Lange, P.A.

(57) ABSTRACT

A drive shaft for transferring torque including a tubular insert extending along an axis and defining a first layer of the drive shaft including at least one straight portion and at least one undulation, wherein the tubular insert includes a first material having a first deformation temperature, and a polymeric tubular covering defining a second layer of the drive shaft surrounding the tubular insert including a second material having a deformation temperature lower than the deformation temperature of the first material, wherein the covering includes at least one straight portion adjacent to the straight portion of the tubular insert and at least one undulation adjacent to the at least one undulation of the tubular insert.

10 Claims, 4 Drawing Sheets

(51) Int. Cl.
    *B32B 1/08*     (2006.01)
    *B32B 27/08*     (2006.01)
    *B29K 101/10*     (2006.01)
    *B29K 101/12*     (2006.01)
    *B29L 31/00*     (2006.01)

(52) U.S. Cl.
    CPC ...... *B29K 2101/10* (2013.01); *B29K 2101/12* (2013.01); *B29L 2031/75* (2013.01); *B32B 2597/00* (2013.01)

(58) Field of Classification Search
    CPC ............ B32B 2250/02; B32B 2250/03; B32B 2260/02; B32B 2260/021; B32B 2260/023; B32B 2260/046; B32B 2262/02; B32B 2262/10; B32B 2307/544; B32B 2307/546; B32B 2307/554; B32B 2307/734; B32B 2597/00; B32B 2605/00; B32B 27/08; B32B 3/28; B32B 7/027; B32B 7/12; B29L 2031/75
    See application file for complete search history.

(56) References Cited

U.S. PATENT DOCUMENTS

| | | | |
|---|---|---|---|
| 4,214,932 A | | 7/1980 | Van Auken |
| 4,664,644 A | * | 5/1987 | Kumata ................. F16F 15/10 464/181 |
| 4,895,551 A | | 1/1990 | Fritz |
| 5,632,837 A | * | 5/1997 | Carmien ................. B25G 1/10 156/172 |
| 8,251,830 B2 | | 8/2012 | Schreiber et al. |
| 2004/0077413 A1 | | 4/2004 | Bradley et al. |
| 2008/0045348 A1 | | 2/2008 | Shin |
| 2016/0257079 A1 | | 9/2016 | Taneda et al. |
| 2017/0268479 A1 | | 9/2017 | Caruso et al. |

* cited by examiner

HYBRID COMPOSITE DRIVE SHAFT AND A METHOD OF MAKING

CROSS-REFERENCE TO RELATED APPLICATIONS

This application is a divisional of U.S. patent application Ser. No. 16/370,489, filed Mar. 29, 2019, the entire content of which is incorporated herein by reference.

BACKGROUND

Technological Field

The present disclosure relates to a hybrid composite drive shaft, and more particularly to a drive shaft using two different types of composites.

Description of Related Art

A variety of devices are known in the making of composite drive shafts. Major challenge in making composite drive shafts is to make profiled segments for bending and axial flexibility. The conventional methods and systems have generally been considered unsatisfactory for their intended purpose. There is still a need for new designs where these challenges can be significantly mitigated or even avoided. There also remains a need in the art for such shafts and methods that are economically viable. The present disclosure may provide a solution for at least one of these remaining challenges.

SUMMARY OF THE INVENTION

A drive shaft for transferring torque includes a tubular insert extending along an axis and defining a first layer of the drive shaft including at least one undulation in the radial direction, wherein the tubular insert includes a first material having a first deformation temperature and a polymeric tubular covering defining a second layer of the drive shaft surrounding the tubular insert including a second material having a deformation temperature lower than the melting point of the first material, wherein the covering includes at least one undulation adjacent to the at least one undulation of the tubular insert. The at least one undulation of the insert can include additional multiple undulations. The insert and the covering can also include straight portions lined up with each other.

The insert can include fiber reinforcement. The insert can be thinner than the covering in a radial direction relative to the axis. The second material can include a fiber reinforced thermoset polymer or thermoplastic polymer matrix composite material, with a deformation temperature lower than the deformation temperature of the first insert material. The drive shaft can further include an adhesive layer between the insert and the covering.

A method of forming a composite drive shaft is also presented. The method includes forming a tubular insert to define a first layer of the drive shaft including forming at least one undulation, wherein the tubular insert includes a first material having a first deformation temperature, reinforcing the insert with a polymeric tubular covering defining a second layer of the drive shaft including a second material having a deformation temperature lower than the deformation temperature of the first material by surrounding the tubular insert, and forming at least one straight portion and at least one undulation within the covering adjacent to the at least one undulation of the tubular insert.

The at least one undulation of the tubular insert can be formed by expanding an initial tubular insert against an external mold or by compression from a heated mold.

The method can further include joining the insert and the covering with an adhesive layer by applying or by spraying or by using other techniques to place the adhesion layer onto the tubular insert.

The method can further include cooling the covering to solidify the drive shaft for thermoplastic materials or curing the covering at a temperature below the first deformation temperature for thermoset materials and above the second deformation temperature. A non-cured or partially cured thermoset polymer matrix covering can be applied onto the formed insert and subsequently cured at a temperature below the insert deformation temperature of the insert material. Forming the at least one undulation of the covering can include compression by a heated mold.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
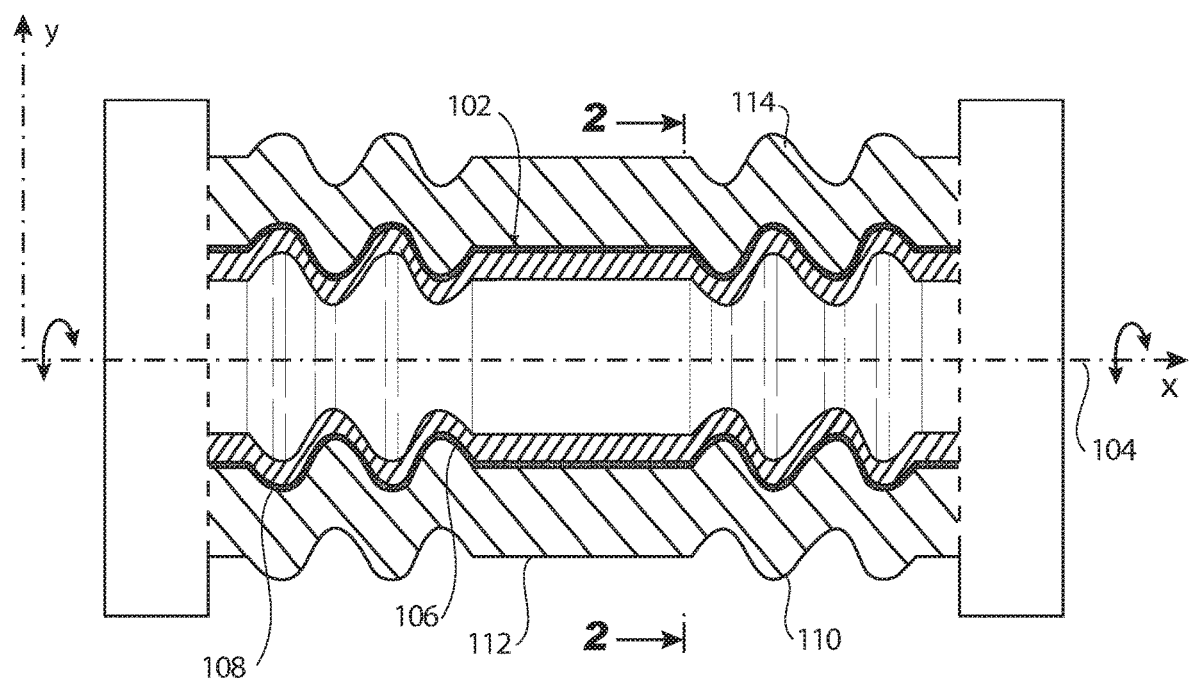
FIG. 1 is an axial cross-sectional view of a drive shaft showing layers and undulations.

Reference will now be made to the drawings wherein like reference numerals identify similar structural features or aspects of the subject invention. For purposes of explanation and illustration, and not limitation, a partial view of an exemplary embodiment of a composite drive shaft in accordance with the invention is shown in FIG. 1 and is designated generally by reference character 100. Other embodiments of the drive in accordance with the invention, or aspects thereof, are provided in FIGS. 2-3f, as will be described. The methods and systems of the invention can be used to simplify the production process and to improve the performance of the drive shaft.

Figure 2:
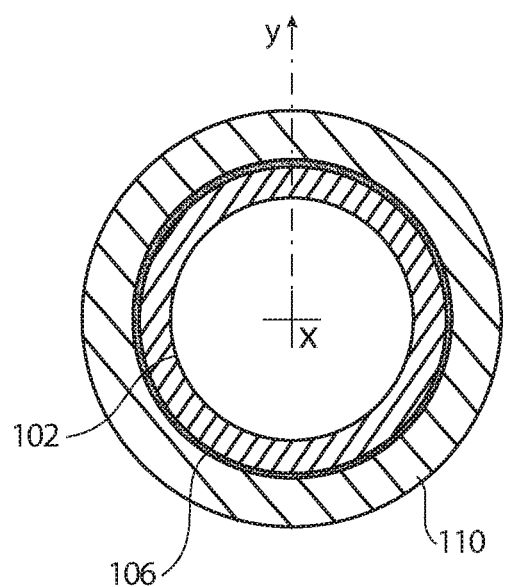
FIG. 2 is a diametric cross-sectional view of FIG. 1, showing the concentricity of the layers.

Referring to FIG. 1, the shaft 100 is disclosed with two different composite materials with distinctively different properties and functions. The first material serves as an insert and works as a mandrel. The second composite material works as a main load-bearing part (LBP), while its complex shape is achieved upon fabrication overlying upon the insert. A drive shaft 100 for transferring torque to another component by mating with the component using and adhesive or mechanical fastener. The shaft includes a tubular insert 102 extending along an axis 104 and defining a first layer of the drive shaft 100 including at least one straight portion 106 and at least one undulation 108, wherein the tubular insert 102 includes a first material having a first deformation temperature and a polymeric tubular covering 110 defining a second layer of the drive shaft 100 surrounding the tubular insert 102 including a second material having a deformation temperature lower than the deformation point of the first material, wherein the covering 110 includes at least one straight portion 112 adjacent to the straight portion 106 of the tubular insert and at least one undulation 114 adjacent to the at least one undulation 108 of the tubular insert. Deformation temperature is the temperature at or above which (and below the degradation temperature) a polymer can be formed or shaped upon application of mechanical force via a shaping tooling or a mold, or through an extrusion or injection process. The ASTM HDT (heat deflection temperature) is the temperature at which a standard sized polymer sample strip is deflected by a fixed distance upon application of a given load via a "pushing" rod. For both semi-crystalline as well as amorphous polymers, glass transition temperature, below which the polymer chains motions are, and above that the polymer chains motions are activated and polymers become rubbery and viscous, and eventually will flow. Only semi-crystalline polymers have a thermodynamically defined melt temperature (Tm) first order transition; amorphous ones do not. The deformation temperature or HDT of a polymer relates to its characteristic Tg temperature. The insert 102 and the covering 110 are concentric in at least one portion of the shaft, as shown in FIG. 2. The undulations 114 and 108 can include multiple undulations. The number of undulations and of the pitch can be determined based on the load conditions.

The insert 102 can include fiber reinforcement. The insert can be thinner than the covering 110 in a radial direction relative to the axis 104. The insert 102 material can include a thermoplastic polymer material, with or without fillers and fibers. The covering 110 material can include fiber reinforced thermoplastic polymer composite material, as well as fiber reinforced thermoset polymer matrix composite material. The drive shaft 100 can further include an adhesive layer 116 between the insert 102 and the covering 110 to provide or improve bonding between the insert 102 and covering 110 layers. The fiber reinforcement can include continuous or/and large discontinuous or/and short fibers. They can be applied, for example, as pre-pregs, fabric, or mats or their combination. The fiber reinforcement can include fibers made of carbon, or aramid polymer or other organic material, or glass or other inorganic material or their combination.

A method of forming a composite drive shaft 100 is also presented. The method includes forming a tubular insert 102 to define a first layer of the drive shaft 100 including forming at least one straight portion 106 and at least one undulation 108, wherein the tubular insert 102 includes a first material having a first deformation temperature, overlaying the insert 102 by a polymeric tubular covering 110 defining a second layer of the drive shaft including a second material having a deformation temperature lower than that of the first material by surrounding the tubular insert 102, and forming at least one straight portion 112 adjacent to the at least one straight portion 106 of the tubular insert and at least one undulation 114 within the covering adjacent to the at least one undulation 108 of the tubular insert. Overlaying can include applying a fiber reinforced non-cured or partially cured thermoset polymer matrix composite onto the insert 102 to form the undulated covering 110, which subsequently can be cured at a temperature below the deformation temperature of the insert layer, optionally utilizing a clamshell mold, to produce the composite gear shaft 100. Overlaying can also include applying a fiber reinforced thermoplastic polymer matrix composite layer and compression molding it to form the undulated covering 110. Overlaying can further include over-molding a discontinuous fiber reinforced thermoplastic polymer matrix composite to form the undulated covering 110. It is also contemplated that the shaft 100 could include more layers, in various arrangements in order to meet the requirements of the system.

Figure 3A:
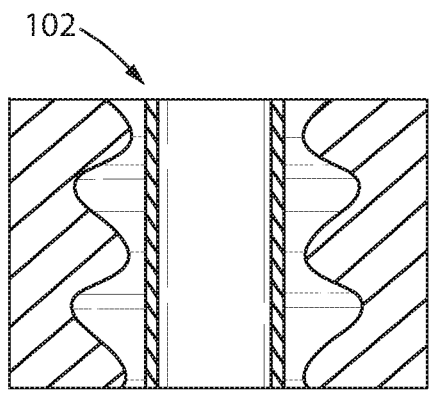
FIG. 3a is an axial cross-sectional view of a production step for forming the undulations of an inner layer of FIG. 1, showing a pre-formed insert.
Figure 3B:
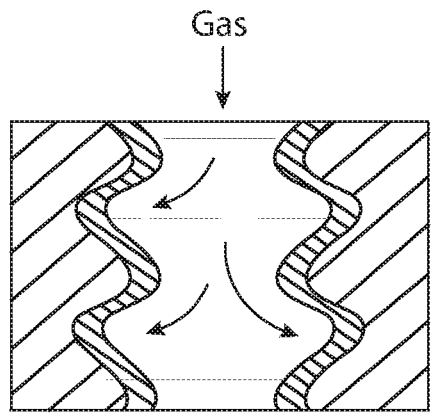
FIG. 3b is an axial cross-sectional view of a production step for forming the undulations of an inner layer of FIG. 1, showing an interaction of the insert and a mold.
Figure 3C:
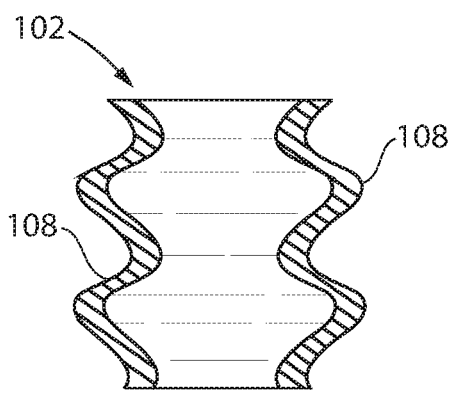
FIG. 3c is an axial cross-sectional view of a production step showing the post-formed undulated insert of an inner layer of FIG. 1.
Figure 3D:
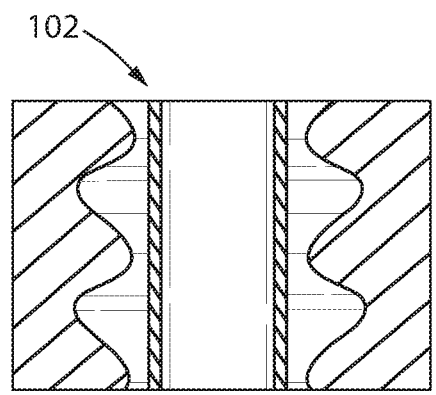
FIG. 3d is an axial cross-sectional view of a production step for forming the undulations of an inner layer of FIG. 1, showing a pre-formed insert.
Figure 3E:
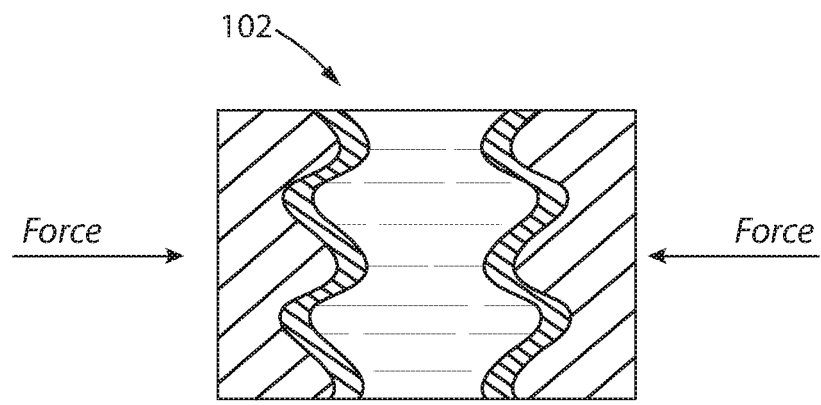
FIG. 3e is an axial cross-sectional view of a production step for forming the undulations of an inner layer of FIG. 1, showing an interaction of the insert and a mold.
Figure 3F:
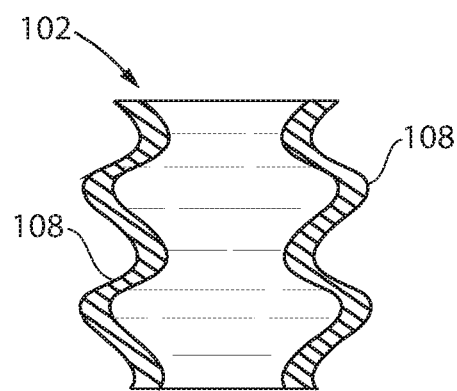
FIG. 3f is an axial cross-sectional view of a production step showing the post-formed undulated insert of an inner layer of FIG. 1.

As shown in FIGS. 3a-c, the at least one undulation 108 of the tubular insert 102 is formed by expanding an initial tubular insert against an external mold. It is also considered, and shown in FIGS. 3d-3f, that the undulation(s) 108 are formed by compression from a heated mold.

The method further includes joining the insert 102 and the covering 110 with an adhesion layer 116 by either overlaying or spraying the adhesive layer onto the tubular insert. The adhesive layer can also be coated on, or placed between the layers as film.

In summary, proposed designs maximize benefits of composites (e.g., lightweight, lack of corrosion, cost) and, at the same time, minimize their disadvantages associated with complexity of fabrication of composite components with internal cavities, such as, for example, drive shafts. The methods and systems of the present disclosure, as described above and shown in the drawings, provide for torque transmission systems and gear shafts that can accommodate bending and flexing requirements, as well as vibration dampening with superior properties including increased reliability and stability, and reduced size, weight, and/or cost. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A method of forming a composite drive shaft comprising:
   forming a tubular insert having a first deformation temperature to define an innermost first layer of the drive shaft with a hollow center, the tubular insert formed by expanding the tubular insert against an external mold using a gas, and wherein forming the tubular insert comprises:
      forming a first end section with multiple undulations; and
      forming a first flat section adjacent the first end section;
   surrounding the first layer with a polymeric tubular covering comprising a second material having a second deformation temperature lower than the first deformation temperature; and forming the covering to define a second layer of the drive shaft, wherein the covering is a main load-bearing part and forming the covering comprises:

forming a second end section with multiple undulations on an exterior and an interior surface, the second end section of the second layer conforming to the first end section of the first layer; and forming a second flat section between adjacent the second end section such that the second flat section of the second layer conforms to the first flat section of the first layer.

2. The method of claim 1, further comprising joining the tubular insert and the polymeric tubular covering with an adhesive layer.

3. The method of claim 2, wherein the joining includes applying the adhesive layer onto the first layer.

4. The method of claim 1, further comprising cooling the covering to solidify the drive shaft.

5. The method of claim 1, further comprising curing the first layer and the second layer at temperature below the first deformation temperature and above the second deformation temperature.

6. The method of claim 1, wherein surrounding includes applying a non-cured or partially cured thermoset polymer matrix composite covering and subsequently curing said applied covering at a temperature below the first deformation temperature.

7. The method of claim 1, wherein forming the polymeric tubular covering to define a second layer of the drive shaft includes compression by a heated mold.

8. The method of claim 1, wherein the tubular insert is made of a thermoplastic polymer material.

9. The method of claim 1, wherein forming the tubular insert further comprises forming a third end section with multiple undulations and wherein forming the covering further comprises forming a fourth end section with multiple undulations on the exterior and the interior surface, the fourth end section of the second layer conforming to the third end section of the first layer, wherein the first flat section is disposed between the first and third end sections and the second flat section is disposed between the second and fourth end sections.

10. The method of claim 1, wherein the undulations of the first end section are axisymmetric.

\* \* \* \* \*